United States Patent
Kamimori

(10) Patent No.: US 8,467,661 B2
(45) Date of Patent: Jun. 18, 2013

(54) VIDEO RECORDING AND REPRODUCING APPARATUS HAVING COMMERCIAL SKIP MODE

(75) Inventor: Yutaka Kamimori, Daito (JP)

(73) Assignee: Funai Electric Co., Ltd., Osaka (JP)

( * ) Notice: Subject to any disclaimer, the term of this patent is extended or adjusted under 35 U.S.C. 154(b) by 1669 days.

(21) Appl. No.: 11/583,388

(22) Filed: Oct. 19, 2006

(65) Prior Publication Data

US 2007/0092202 A1    Apr. 26, 2007

(30) Foreign Application Priority Data

Oct. 20, 2005   (JP) .................................. 2005-305527

(51) Int. Cl.
*H04N 5/775*    (2006.01)
*H04N 9/80*    (2006.01)

(52) U.S. Cl.
USPC .......................................... 386/248; 386/230

(58) Field of Classification Search
USPC ............ 386/1, 45–46, 83, 125–126, 248–251
See application file for complete search history.

(56) References Cited

U.S. PATENT DOCUMENTS

| | | | |
|---|---|---|---|
| 6,522,309 B1 * | 2/2003 | Weber ............................ | 345/1.1 |
| 7,034,777 B1 * | 4/2006 | McLarty et al. ................ | 345/2.2 |
| 7,440,674 B2 * | 10/2008 | Plotnick et al. ................ | 386/343 |
| 2005/0262539 A1 * | 11/2005 | Barton et al. ................... | 725/90 |

FOREIGN PATENT DOCUMENTS

JP    2003-319314    11/2003

OTHER PUBLICATIONS

Patent Abstracts of Japan, Publication No. 2003-319314, Publication Date: Nov. 7, 2003, 1 page.

\* cited by examiner

*Primary Examiner* — Thai Tran
*Assistant Examiner* — Nigar Chowdhury
(74) *Attorney, Agent, or Firm* — Osha Liang LLP

(57) ABSTRACT

A DVD recorder with a built-in HDD records a selected television program and commercial information about a commercial in the television program when recording. In a commercial skip mode, the recorder displays on a TV monitor only a program video of the television program with a commercial video in the television program skipped, and displays on a display screen on the front surface of the body of the recorder commercial information about the skipped commercial video. Therefore, a sponsor can provide an advertisement to a viewer even when the commercial skip mode is performed, by means of the commercial information displayed on the display screen.

11 Claims, 4 Drawing Sheets

VIDEO RECORDING AND REPRODUCING APPARATUS HAVING COMMERCIAL SKIP MODE

BACKGROUND OF THE INVENTION

1. Field of the Invention

The present invention relates to a video recording and reproducing apparatus, and in particular, a video recording and reproducing apparatus having a commercial skip mode in which a program video of a recorded television program is reproduced with a commercial video in the recorded television program skipped.

2. Description of the Background Art

When users of video recording and reproducing apparatuses such as a DVD (Digital Video Disk) recorder with a built-in HDD (Hard Disk Drive) and a VTR (Video Tape Recorder) reproduce and watch a recorded television program, they often skip or fast-forward a commercial video and watch only a program video of the recorded television program. Accordingly, there has been proposed a video recording and reproducing apparatus having a commercial skip mode in which a program video of a recorded television program is reproduced with a commercial video in the recorded television program skipped automatically (Japanese Patent Laying-Open No. 2003-319314).

In a conventional video recording and reproducing apparatus, however, there has been a problem that a sponsor of a television program cannot provide any advertisement to a viewer when the commercial skip mode is performed.

SUMMARY OF THE INVENTION

One object of the present invention is therefore to provide a video recording and reproducing apparatus allowing a sponsor of a television program to advertise to a viewer even when a commercial skip mode is performed.

A video recording and reproducing apparatus in accordance with the present invention is characterized in that a video recording and reproducing apparatus recording a received television program on a hard disk and reading the recorded television program from the hard disk for reproduction and display on a monitor device includes: a display screen provided on a front surface of a body of the video recording and reproducing apparatus; and a control unit displaying on the display screen commercial information about a commercial video skipped in a commercial skip mode in which a program video of the television program recorded on the hard disk is reproduced with the commercial video in the recorded television program skipped.

Further, the video recording and reproducing apparatus in accordance with the present invention is characterized in that a video recording and reproducing apparatus having a commercial skip mode in which a program video of a recorded television program is reproduced with a commercial video in the recorded television program, skipped includes: a display screen provided in a body of the video recording and reproducing apparatus; and a control unit displaying on the display screen commercial information about the commercial video skipped in the commercial skip mode.

Preferably, in addition to a channel broadcasting the television program, a channel broadcasting commercial information about the commercial video is provided, and the control unit also records the commercial information when recording the television program, and displays at least a portion of the recorded commercial information on the display screen in the commercial skip mode.

Preferably, an Internet address of the commercial information is also broadcast together with the television program, and the control unit also records the Internet address of the commercial information when recording the television program, and displays the commercial information obtained from the recorded Internet address on the display screen in the commercial skip mode.

In the video recording and reproducing apparatus in accordance with the present invention, a display screen is provided in the body of the apparatus to display commercial information about a commercial video skipped in the commercial skip mode. Therefore, the sponsor can provide an advertisement to a viewer even when the commercial skip mode is performed, by means of the commercial information displayed on the display screen.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

First Embodiment

Figure 1:
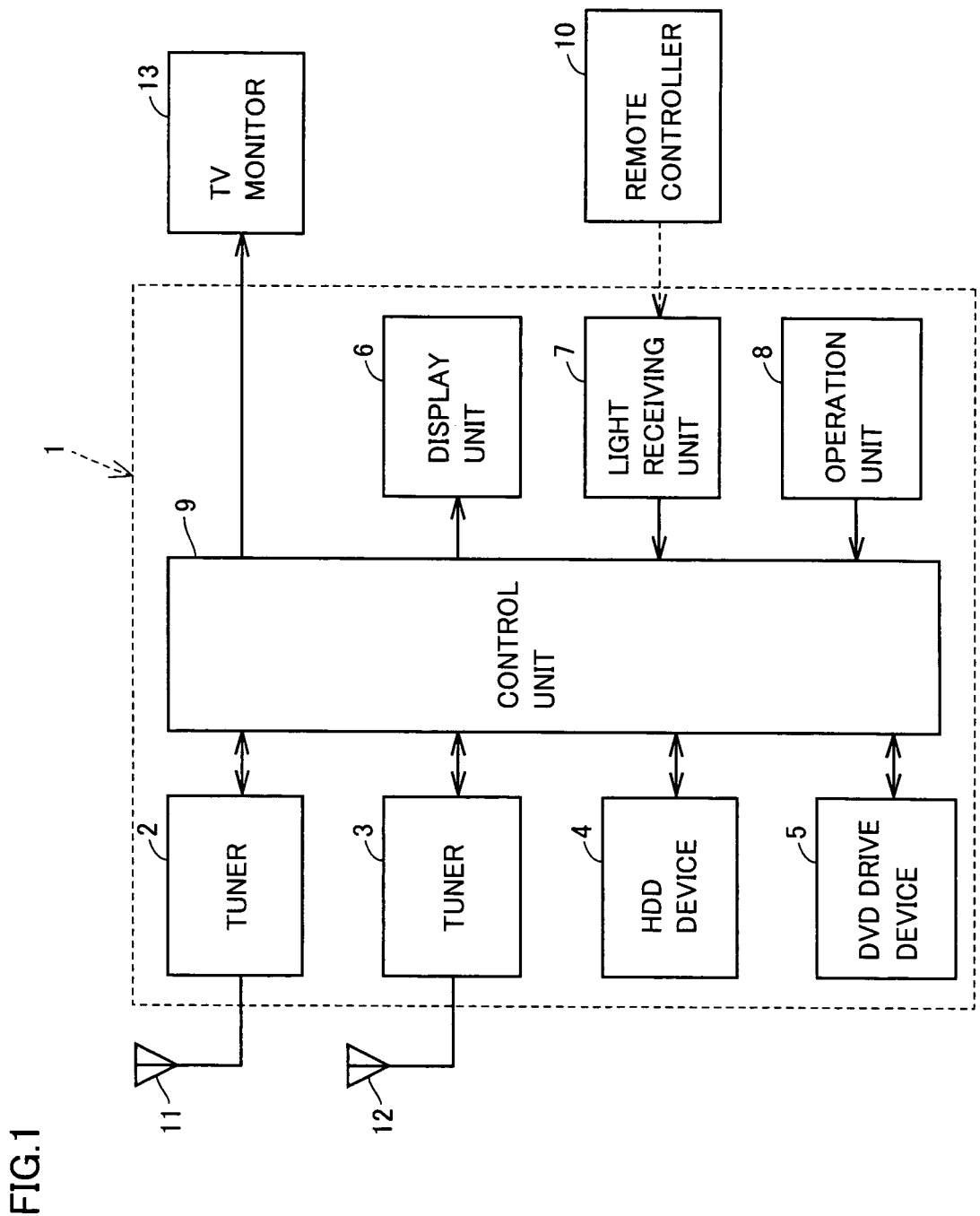
FIG. 1 is a block diagram showing a structure of a DVD recorder with a built-in HDD in accordance with a first embodiment of the present invention.

FIG. 1 is a block diagram showing a structure of a DVD recorder 1 with a built-in HDD in accordance with a first embodiment of the present invention. Referring to FIG. 1, DVD recorder 1 with a built-in HDD includes tuners 2 and 3, an HDD device 4, a DVD drive device 5, a display unit 6, a light receiving unit 7, an operation unit 8, and a control unit 9. DVD recorder 1 with a built-in HDD can be operated by a remote controller 10.

Tuner 2 receives an electric wave of a television broadcast via an antenna 11, extracts from the received electric wave a video signal of a television program on a channel selected by a viewer, who is a user of recorder 1, and supplies the extracted video signal to control unit 9. Tuner 3 receives an electric wave of a commercial information broadcast via an antenna 12, extracts from the received electric wave an information signal on a commercial information channel corresponding to the channel selected by the viewer, and supplies the extracted information signal to control unit 9.

HDD device 4 includes a hard disk. When recording, HDD device 4 records the video signal, the information signal, and the like supplied from control unit 9 on the hard disk, and when reproducing, HDD device 4 reads the signals recorded on the hard disk and supplies them to control unit 9. When recording, DVD drive device 5 writes the video signal and the like supplied from control unit 9 on an installed DVD, and when reproducing, DVD drive device 5 reads the signals recorded on the DVD and supplies them to control unit 9.

Display unit 6 includes a display screen provided on a front surface of the body of recorder 1, and displays commercial information about a commercial skipped when a commercial skip mode is performed, the number of a channel selected by the viewer, time, and the like. Remote controller 10 includes various keys and buttons, and emits an optical signal corresponding to a key or a button operated by the viewer. Light receiving unit 7 performs photoelectric conversion on the optical signal emitted from remote controller 10 to generate a control signal, and supplies the control signal to control unit 9. Operation unit 8 includes various keys and buttons, and generates a control signal corresponding to a key or a button operated by the viewer and supplies the control signal to control unit 9. The viewer can operate remote controller 10 or operation unit 8 to select a channel or to set recording, timer recording, reproduction, the commercial skip mode, and the like.

Control unit 9 controls entire recorder 1 in response to the control signal supplied from remote controller 10 via light receiving unit 7 and the control signal supplied from operation unit 8. Specifically, control unit 9 supplies the video signal supplied from tuner 2 to a TV (television) monitor 13 to display the television program. When recording, control unit 9 supplies the video signal and the information signal supplied from tuners 2 and 3, respectively, to HDD device 4 to record the signals on the hard disk. When reproducing, control unit 9 reads the video signal of the television program, movie or the like selected by the viewer from HDD device 4 or DVD drive device 5, and supplies the video signal to TV monitor 13 to display the television program, movie, or the like.

When the commercial skip mode is performed during reproduction, control unit 9 reads from HDD device 4 a video signal of a program video of the television program selected by the viewer, and supplies the video signal to TV monitor 13 to display only the program video of the television program. At the same time, control unit 9 reads from HDD device 4 an information signal corresponding to a commercial in the television program, and supplies the information signal to display unit 6 to display commercial information. Further, control unit 9 supplies a signal selected by the viewer among the signals recorded in HDD device 4, to DVD drive device 5 to record the signal on the DVD. Furthermore, control unit 9 supplies a signal selected by the viewer among the signals recorded on the DVD, to HDD device 4 to record the signal on the hard disk.

Figure 2:
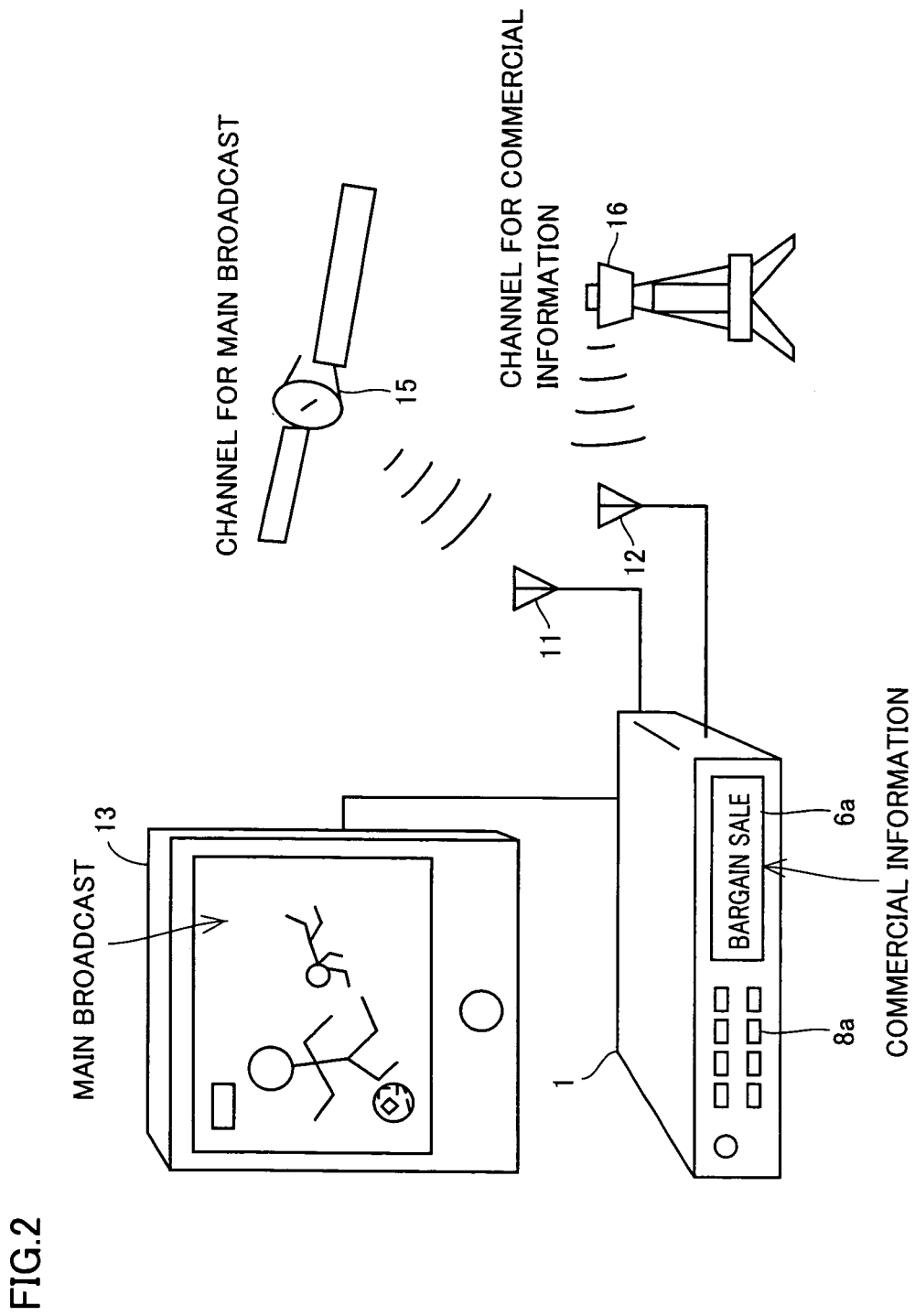
FIG. 2 is a view for illustrating an operation of the DVD recorder with a built-in HDD shown in FIG. 1.

FIG. 2 is a view for illustrating an operation of DVD recorder 1 with a built-in HDD. Referring to FIG. 2, the front surface of the body of recorder 1 is provided with a display screen 6a of display unit 6, various buttons 8a included in operation unit 8, and the like. An electric wave transmitted from a television broadcasting station (not shown) via a broadcast satellite 15 is received by antenna 11, and an electric wave transmitted from a commercial information broadcasting station 16 is received by antenna 12. When recording, a video signal of a television program on a channel selected by a viewer is extracted from the received electric wave and recorded in HDD device 4. At the same time, an information signal on a commercial information channel corresponding to the channel selected by the viewer is extracted from the received electric wave and recorded in HDD device 4.

When reproducing the recorded television program in the commercial skip mode, a video signal of a program video of the television program is read from HDD device 4, and supplied to TV monitor 13. At the same time, an information signal corresponding to a commercial in the television program is read from HDD device 4, and supplied to display unit 6. Thereby, TV monitor 13 displays only the program video of the television program with a commercial video in the television program skipped, and display screen 6a of recorder 1 displays commercial information about the commercial in the television program.

In the first embodiment, display screen 6a is provided on the front surface of the body of recorder 1 to display the commercial information about the commercial video skipped in the commercial skip mode. Therefore, the sponsor can provide an advertisement to the viewer even when the commercial skip mode is performed.

Second Embodiment

Figure 3:
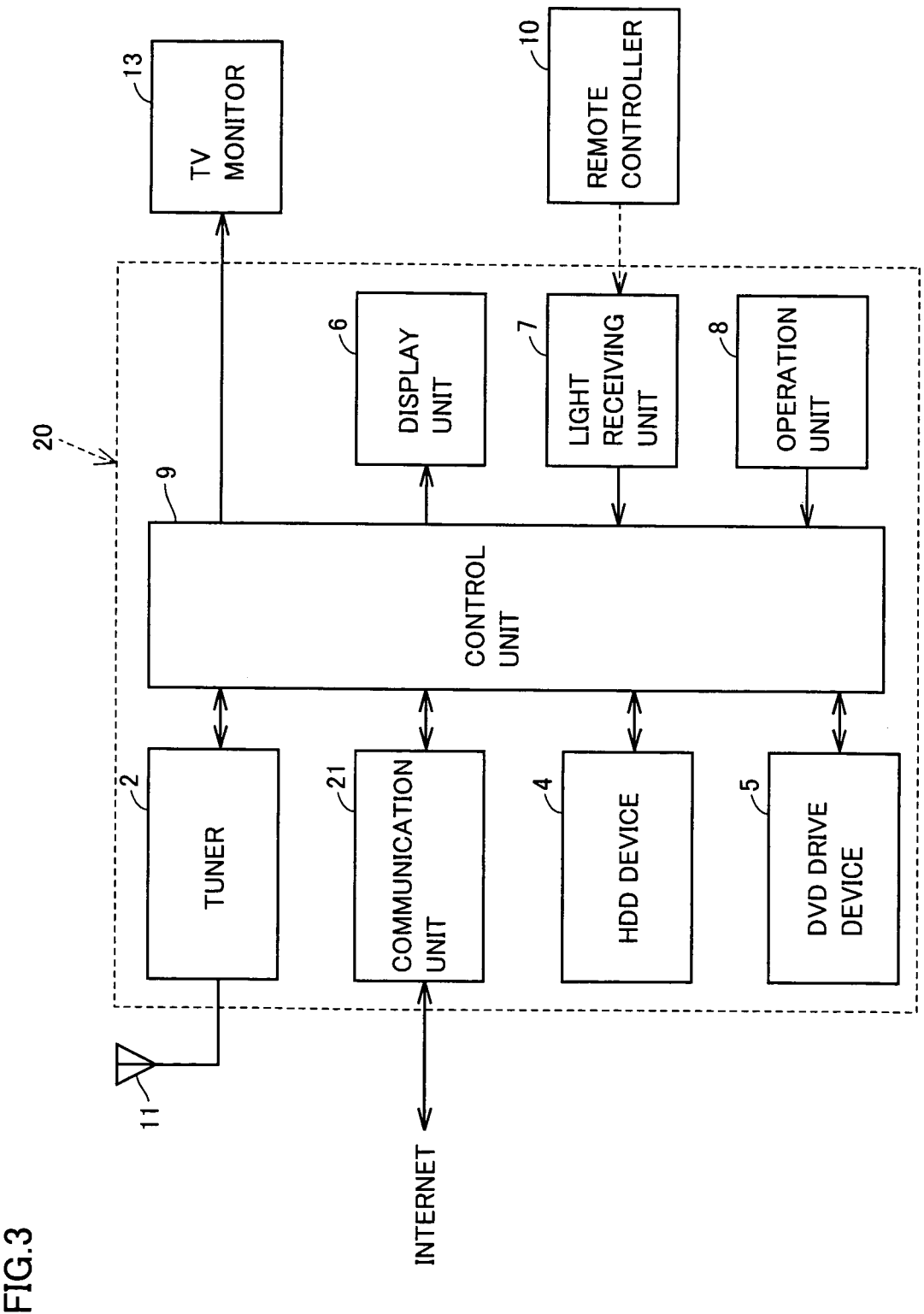
FIG. 3 is a block diagram showing a structure of a DVD recorder with a built-in HDD in accordance with a second embodiment of the present invention.

FIG. 3 is a block diagram showing a structure of a DVD recorder 20 with a built-in HDD in accordance with a second embodiment of the present invention, which is contrasted with FIG. 1. Referring to FIG. 3, DVD recorder 20 with a built-in HDD is different from DVD recorder 1 with a built-in HDD in FIG. 1 in that tuner 3 is replaced with a communication unit 21. Communication unit 21 obtains from the Internet commercial information on an Internet address supplied from control unit 9, and supplies the obtained commercial information to control unit 9.

A video signal of a television program is overlapped with an Internet address of a commercial in the television program. When recording, control unit 9 supplies the video signal and the Internet address supplied from tuner 2 to HDD device 4 to record them on the hard disk. In the commercial skip mode, control unit 9 reads from HDD device 4 a video signal of a program video of a television program selected by a viewer, and supplies the video signal to TV monitor 13 to display only the program video of the television program. At the same time, control unit 9 reads from HDD device 4 an Internet address corresponding to a commercial in the television program, supplies the Internet address to communication unit 21 to obtain commercial information, and allows display unit 6 to display the commercial information.

Figure 4:
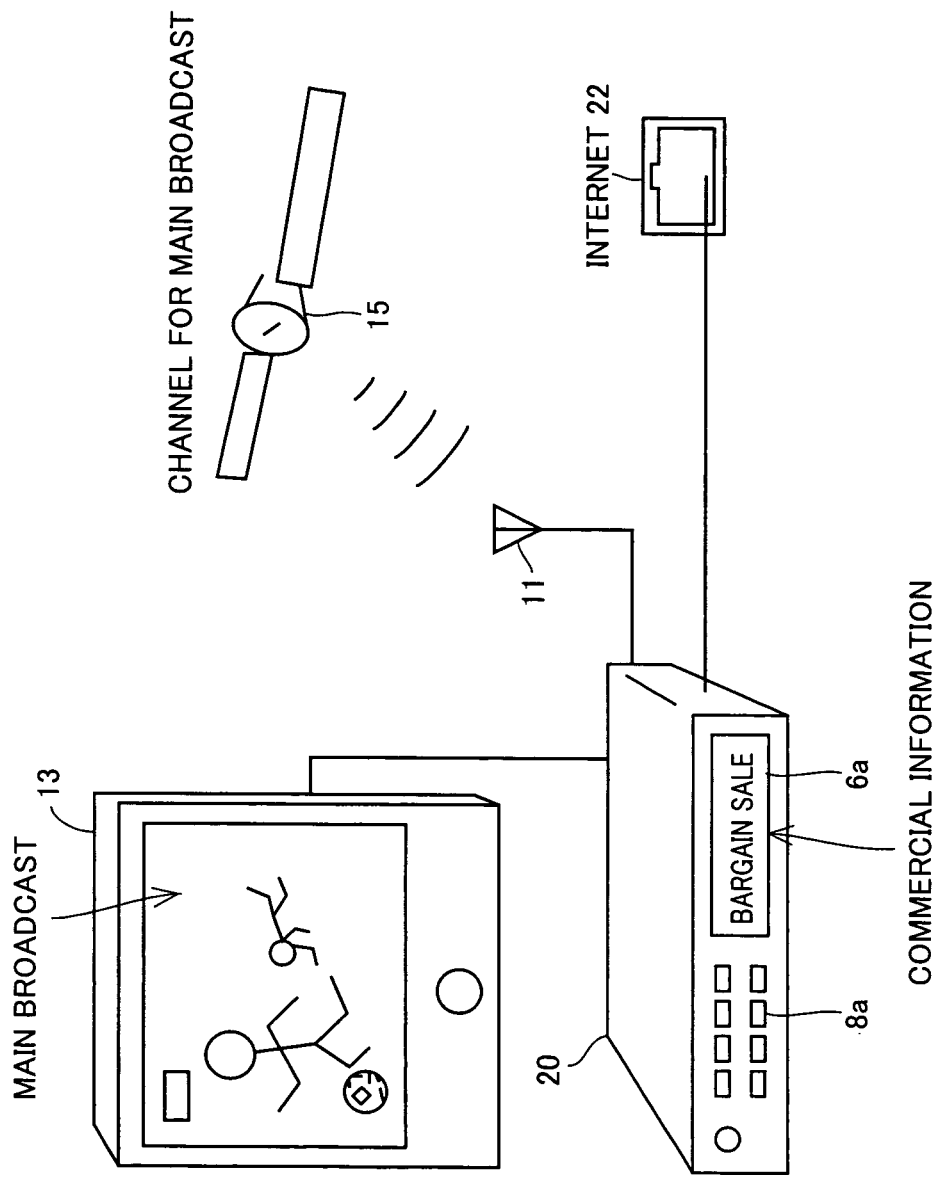
FIG. 4 is a view for illustrating an operation of the DVD recorder with a built-in HDD shown in FIG. 3.

FIG. 4 is a view for illustrating an operation of DVD recorder 20 with a built-in HDD. Referring to FIG. 4, the front surface of the body of recorder 20 is provided with display screen 6a of display unit 6, various buttons 8a included in operation unit 8, and the like. An electric wave transmitted from a television broadcasting station (not shown) via broadcast satellite 15 is received by antenna 11. When recording, a video signal of a television program on a channel selected by a viewer is extracted from the received electric wave, and recorded in HDD device 4. At the same time, an Internet address corresponding to a commercial in the television program is extracted from the received electric wave, and recorded in HDD device 4.

When reproducing the recorded television program in the commercial skip mode, a video signal of a program video of the television program is read from HDD device 4, and supplied to TV monitor 13. At the same time, commercial information corresponding to the commercial in the television program is obtained from the Internet 22, and supplied to display unit 6. Thereby, TV monitor 13 displays only the program video of the television program with a commercial video in the television program skipped, and display screen 6a of recorder 20 displays the commercial information about the commercial in the television program.

The same effect as the first embodiment can also be obtained in the second embodiment.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A personal video recorder (PVR) recording a received television program on a hard disk and reading the recorded television program from said hard disk for reproduction and display on a monitor device disposed separately from the PVR, the PVR comprising:
   a display screen provided on a front surface of a body of the PVR; and
   a control unit that controls displays on the display screen and the monitor device,
   wherein the control unit is adapted to display on said display screen commercial information about a commercial video skipped in a commercial skip mode in which a program video of the television program recorded on said hard disk is reproduced with the commercial video in the recorded television program skipped, and to cause the monitor device to display the program video with the commercial video skipped, and
   wherein the monitor device and the PVR are separate devices.

2. A recording device having a commercial skip mode that allows a program video of a recorded television program to be reproduced on a separately disposed monitor device with a commercial video in the recorded television program skipped, the recording device comprising:
   a display screen provided in a body of said recording device; and
   a control unit that controls displays on the display screen and the monitor device,
   wherein the control unit is adapted to display on said display screen commercial information about the commercial video skipped in said commercial skip mode, and causes the monitor device to display the program video with the commercial video skipped,
   wherein the monitor device and the recording device are separate devices.

3. The recording device according to claim 2, wherein
   in addition to a channel broadcasting said television program, a channel broadcasting commercial information about said commercial video is provided, and
   said control unit also records said commercial information when recording said television program, and displays at least a portion of said recorded commercial information on said display screen in said commercial skip mode.

4. The recording device according to claim 2, wherein
   an Internet address of said commercial information is also broadcast together with said television program, and
   said control unit also records the Internet address of said commercial information when recording said television program, and displays said commercial information obtained from the recorded Internet address on said display screen in said commercial skip mode.

5. The recording device according to claim 2, wherein the commercial information displayed on the display screen is separate from the commercial video itself.

6. The recording device according to claim 2, wherein the commercial information is character information.

7. The PVR according to claim 1, wherein the control unit is capable of identifying the commercial information and the program video and separating the commercial information from the program video.

8. The PVR according to claim 1, wherein a video signal of the program video is read from the hard disk and supplied to the monitor device while information corresponding to the commercial information is obtained from the Internet.

9. The recording device according to claim 2, wherein the control unit is capable of identifying the commercial information and the program video and separating the commercial information from the program video.

10. The recording device according to claim 2, wherein a video signal of the program video is read from the hard disk and supplied to the monitor device while information corresponding to the commercial information is obtained from the Internet.

11. A recording device recording a received television program on a hard disk and reading the recorded television program from said hard disk for reproduction and display on a monitor device disposed separately from the recording device, the recording device comprising:
   a display screen provided on a front surface of a body of the recording device; and
   a control unit that controls displays on the display screen and the monitor device,
   wherein the control unit is adapted to display on said display screen commercial information about a commercial video skipped in a commercial skip mode in which a program video of the television program recorded on said hard disk is reproduced with the commercial video in the recorded television program skipped, and to cause the monitor device to display the program video with the commercial video skipped, and
   wherein the monitor device and the recording device are separate devices.

* * * * *